US011722200B2

(12) United States Patent
Faxér et al.

(10) Patent No.: US 11,722,200 B2
(45) Date of Patent: *Aug. 8, 2023

(54) APPARATUSES AND METHODS FOR RSRP MEASUREMENTS FOR A WIRELESS DEVICE WITH VARIABLE OUTPUT POWER PER ANTENNA ARRANGEMENT

(71) Applicant: Telefonaktiebolaget LM Ericsson (publ), Stockholm (SE)

(72) Inventors: Sebastian Faxér, Järfälla (SE); Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/560,315

(22) Filed: Dec. 23, 2021

(65) Prior Publication Data
US 2022/0116098 A1 Apr. 14, 2022

Related U.S. Application Data

(63) Continuation of application No. 16/347,076, filed as application No. PCT/EP2019/053745 on Feb. 14, 2019, now Pat. No. 11,223,409.

(51) Int. Cl.
*H04B 7/06* (2006.01)
*H04W 52/24* (2009.01)
*H04W 52/42* (2009.01)

(52) U.S. Cl.
CPC ........ *H04B 7/0695* (2013.01); *H04W 52/245* (2013.01); *H04W 52/42* (2013.01)

(58) Field of Classification Search
CPC .. H04B 7/0695; H04B 7/0408; H04B 7/0617; H04B 7/088; H04B 17/382; H04B 7/082;
(Continued)

(56) References Cited

U.S. PATENT DOCUMENTS

| | | | |
|---|---|---|---|
| 4,920,534 A | * | 4/1990 | Adelmann .......... H04L 49/9078 375/242 |
| 2009/0135942 A1 | * | 5/2009 | Kim ....................... H04L 47/50 375/267 |

(Continued)

FOREIGN PATENT DOCUMENTS

| | | | |
|---|---|---|---|
| KR | 20190122069 A | * | 4/2018 |
| KR | 20190122069 A | | 10/2019 |
| WO | 2018/083253 A1 | | 5/2018 |

OTHER PUBLICATIONS

What Will 5G Be?, Jeffrey G. Andrews, IEEE JSAC Special Issue on 5G Wireless Communication System, 12, May 2014; arXiv: 1405.2957v1. (Year: 2014).*

(Continued)

*Primary Examiner* — Ayaz R Sheikh
*Assistant Examiner* — Louis Samara
(74) *Attorney, Agent, or Firm* — Rothwell, Figg, Ernst & Manbeck, P.C.

(57) ABSTRACT

When a TRP performs a TRP beam sweep for a WD with multiple antenna arrangements and the WD is expected to perform an UL transmission (e.g., the WD has at least a threshold amount of data in its transmit buffer) and UL beam selection is based on DL beam selection, in one embodiment the WD takes the available output power of the different antenna arrangements in to account during RSRP calculations for the different candidate TRP TX beams such that the RSRP from an antenna arrangement that has lower available output power is weighted less compared to the RSRP measured from an antenna arrangement that has higher available output power.

20 Claims, 8 Drawing Sheets

(58) Field of Classification Search
CPC . H04W 52/245; H04W 52/42; H04W 72/042;
H04L 5/0053; H04L 5/008
See application file for complete search history.

(56) References Cited

U.S. PATENT DOCUMENTS

| | | | | |
|---|---|---|---|---|
| 2018/0034531 A1* | 2/2018 | Sadiq | ................... | H04B 7/0408 |
| 2018/0219664 A1* | 8/2018 | Guo | ...................... | H04L 5/0053 |
| 2018/0288645 A1* | 10/2018 | Lee | ...................... | H04B 17/382 |
| 2018/0351630 A1* | 12/2018 | Nilsson | .................. | H04B 7/088 |
| 2019/0045494 A1* | 2/2019 | Ho | ........................ | H04W 76/27 |
| 2019/0306875 A1* | 10/2019 | Zhou | .................... | H04L 5/0053 |
| 2020/0267760 A1* | 8/2020 | Bhattad | ................... | H04L 5/008 |
| 2020/0404693 A1* | 12/2020 | Zhou | .................... | H04B 7/0695 |
| 2021/0083753 A1* | 3/2021 | Kim | ...................... | H04B 7/082 |

OTHER PUBLICATIONS

International Search Report dated Oct. 16, 2019 issued in International Application No. PCT/EP2019/053745 (5 pages).

* cited by examiner

US 11,722,200 B2

APPARATUSES AND METHODS FOR RSRP MEASUREMENTS FOR A WIRELESS DEVICE WITH VARIABLE OUTPUT POWER PER ANTENNA ARRANGEMENT

CROSS-REFERENCE TO RELATED APPLICATIONS

This application is a continuation of U.S. application Ser. No. 16/347,076, filed on May 2, 2019, which is a national stage entry of PCT/EP2019/053745, filed on Feb. 14, 2019. The above identified applications are incorporated by this reference.

TECHNICAL FIELD

This disclosure relates to apparatuses and methods for reference signal received power (RSRP) measurements.

BACKGROUND

Beam Management

Narrow beam transmission and reception schemes are typically needed at higher frequencies to compensate for high propagation loss. For a given communication link, a beam can be applied at both the transmit/receive point (TRP) (i.e., an access point, such as a base station, or a component of an access point) and a wireless device (WD), which will be referred to as a beam pair link (BPL) in this disclosure. As used herein a WD is a communication device (mobile or stationary) that is capable of wireless communication with a TRP (examples of WDs includes: smartphones, smart appliances, Cellular Internet-of-Things (CIoT) devices, etc.).

A beam management procedure is employed to discover and maintain a TRP 104 beam 112 (e.g., a TRP transmit (TX) beam) and/or a WD 102 beam 116 (e.g., a WD receive (RX) beam). In the example of FIG. 1, one BPL has been discovered (i.e., the beam pair that consists of TRP beam 112 and WD beam 116) and is being maintained by the network. A BPL is expected to mainly be discovered and monitored by the network using measurements on downlink (DL) reference signals (RSs) used for beam management, e.g., CSI-RS (channel-state-information RS). The CSI-RS for beam management can be transmitted periodically, semi-persistently or aperiodic (event triggered) and they can be either shared between multiple WDs or be WD-specific. In order to find a suitable TRP TX beam the TRP 104 transmits CSI-RS in different TRP TX beams on which the WD 102 performs RSRP measurements and reports back the N best TRP TX beams (where N can be configured by the network). Furthermore, the CSI-RS transmission on a given TRP TX beam can be repeated to allow the WD to evaluate suitable WD beam (WD RX beam training). Which RX beam the WD chooses will be agnostic to the TR in NR, hence there is no need for the WD to signal back to the TRP the RX beam chosen by the WD.

It is expected that the determination of a BPL between a TRP and WD (i.e. finding a suitable TRP beam and WD beam) starts with a P2 beam sweep (illustrated in FIG. 2A), which means that the TRP transmits CSI-RS in different TRP beams 203 and the WD measures RSRP using a fixed WD RX beam 201 for each of its antenna panels (only one is shown in this example) and signals back the CSI-RS resource index(s) (CRI(s)) corresponding to the highest RSRP(s) (the WD has to report the TRP beam(s) with highest RSRP according the standard and there might be RAN4 tests that check that the WD follow this). During such P2 beam sweep it is expected that the WD will apply as wide beam as possible of each WD panel such that as many propagation paths as possible between the TRP and the WD can be evaluated during the P2 beam sweep.

In the next step the TRP is expected to do a P3 beam sweep (illustrated in FIG. 2B), where the TRP transmits a burst of CSI-RS in (typically) the best reported TRP TX beam from the P2 procedure (beam 250 in the example shown in FIG. 2B), which means that the WD can sweep through different WD RX beams 205, perform measurements on the CSI-RS and select a preferred WD RX beam (e.g., beam 251). How the WD determine the candidate WD RX beams is up to WD implementation. As long as both the TRP and WD has beam correspondence, it is expected that the same BPL (i.e. the same TRP beam and WD beam) also will be used for UL.

WD Antenna Implementation

For UEs, the incoming signals can arrive from many different directions. Accordingly, it is beneficial to have an antenna implementation at the WD which has the possibility to generate omni-directional-like coverage in addition to high gain narrow beams. One way to increase the omni-directional coverage at a WD is to install multiple panels, and point the panels in different directions, as schematically illustrated in FIG. 3 for a WD 302 with two panels.

It is also possible that the WD is not equipped with antenna panels, but for example instead has directional antennas pointing in different directions as schematically illustrated in FIG. 4, for a WD 402 with four antennas (411, 412, 413, and 414) pointing in different directions.

Different Output Power for Different WD Antenna Arrangements

A WD equipped with multiple antenna arrangements (e.g., antenna panels or antennas) might have different available power to transmit from the different arrangements. For example, it has been agreed in 3GPP that NR should support three different categories of UEs: 1) UEs that can transmit with full output power for each of the WD TX chains, 2) UEs that can transmit with full output power for only a subset of all the WD TX chains, and 3) UEs that cannot transmit with full output power on any of the WD TX chains. Especially for alternative 2), different WD antenna arrangements will have different maximum allowed output power.

Also, it is currently a discussion in 3GPP about restricting WD output power for certain WD TX beams that transmits power in directions towards sensitive objects, like for example a human body. It is possible that a subset of the UEs antenna arrangements are transmitting in a direction of a sensitive object and therefore have to reduce the maximum allowed output power, hence, in this case, different WD antenna arrangement will have different maximum allowed output power.

Furthermore, a WD equipped with multiple antenna arrangements might turn off the transmitter chain for a subset of the arrangements while still keeping all receiver chains active. The arrangements with turned off TX chains can be considered to have zero transmission power, while the arrangements that still have active TX chains have a higher potential output power, hence one can say that the transmission power will differ for different arrangements at the WD for this scenario.

SUMMARY

Certain challenges presently exist. During a TRP TX beam sweep (e.g., a 3GPP P2 beam management procedure), the WD should measure the RSRP for the different candidate TRP TX beams and report the N beams with highest RSRP. If beam correspondence is fulfilled at both the TRP and WD, it expected that the TRP will configure the WD with UL transmission in the same BPL as is used for DL transmission. When the WD has multiple antenna arrangements, the straightforward solution for calculating the RSRP would be to just calculate RSRP for each CSI-RS resource (i.e., for each TRP TX beam) for each WD antenna arrangement, and then take a linear average of the multiple RSRP values to get the resulting RSRP value (for each TRP TX beam). This, however, might lead to sub-optimal recommendations of TRP TX beams w.r.t the WD UL transmission, since the BPL determined in this way might depend on an antenna arrangement with significantly lower output power (or even zero output power if the transmit chain is turned off).

To overcome this problem, when a TRP performs a TRP TX beam sweep for a WD with multiple antenna arrangements, in one particular embodiment, if the WD is expected to perform an UL transmission (e.g., the WD has at least a threshold amount of data in its transmit buffer) and zero or more other conditions are met, then the WD will take the available output power of the different antenna arrangements in to account during RSRP calculations for the different TRP TX beams such that the RSRP from an antenna arrangement that has lower available output power is weighted less compared to the RSRP measured from an antenna arrangement that has higher available output power.

Accordingly, in one aspect there is provided a process performed by a WD for selecting candidate TX beams included in a set of candidate TX beams including at least a first candidate TX beam b1. The WD includes a first antenna arrangement (AA1), a second antenna arrangement (AA2), and an uplink (UL) transmit buffer. The process includes determining a first uplink transmit power (TP1) for the AA1 and determining a second uplink transmit power (TP2) for AA2. The process also includes using the AA1 to receive a reference signal transmitted by a base station using the first candidate TX beam. The process also includes obtaining, based on the reference signal transmitted by the base station using the first candidate TX beam and received using AA1, a first received reference signal power value (P11) associated with AA1. The process also includes using AA2 to receive the reference signal transmitted by the base station using the first candidate TX beam. The process also includes obtaining, based on the reference signal transmitted by the base station using the first candidate TX beam and received using AA2, a second received reference signal power value (P12) associated with AA2. The process also includes determining a final reference signal received power value (Pn1) for the first candidate TX beam using P11 and P12 and further using TP1, TP2, information indicating an amount of data in the uplink transmit buffer, an estimate of an UL link budget, and/or information indicating whether or not UL beam selection is determined based on DL beam selection. The process also includes using Pn1 to assign a rank to the first candidate TX beam. The process also includes determining, based on the rank assigned to the first candidate TX beam, whether or not to include in a beam report a beam indicator (e.g., a CRI) indicating the first candidate TX beam. The process further includes transmitting the beam report to the base station, wherein the beam report includes at least one beam indicator indicating at least one candidate TX beam.

An advantage of the above described embodiment is that the TRP TX beam can be selected taking the UL performance in to account, which will make it possible for the WD to balance the UL and DL performance in an optimal way.

BRIEF DESCRIPTION OF THE DRAWINGS

The accompanying drawings, which are incorporated herein and form part of the specification, illustrate various embodiments.

DETAILED DESCRIPTION

Figure 1:
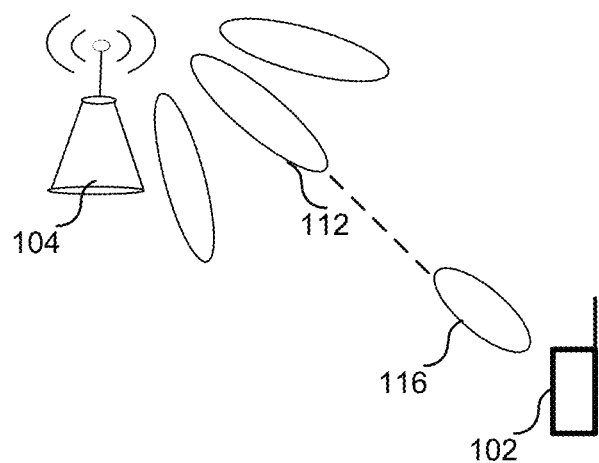
FIG. 1 illustrates a conventional beam-pair link (BPL).
Figure 2A:
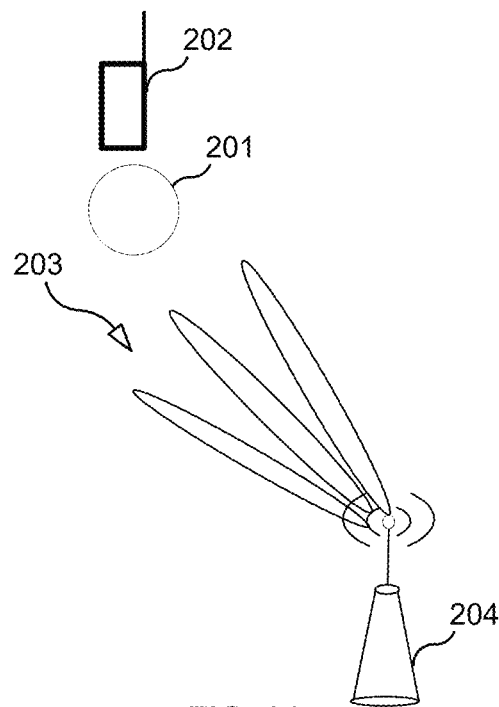
FIG. 2A illustrates a P2 beam sweep for identifying a best TRP TX beam.
Figure 2B:
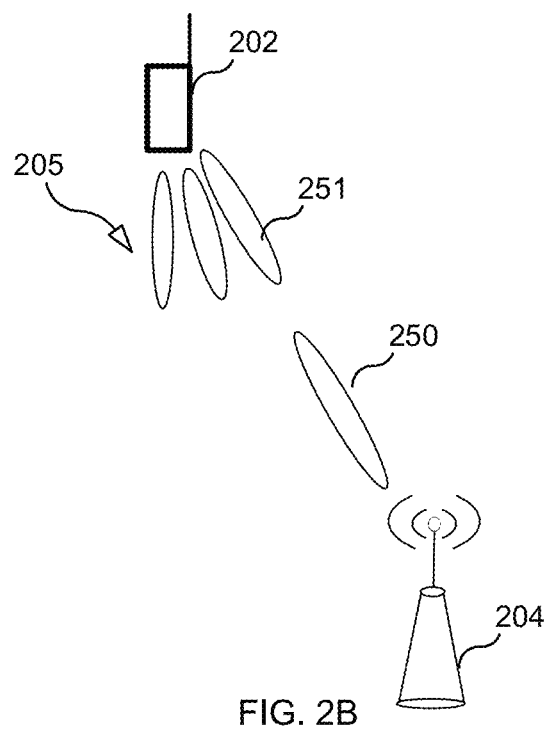
FIG. 2B illustrates a P3 beam sweep for identifying a best WD RX beam.
Figure 3:
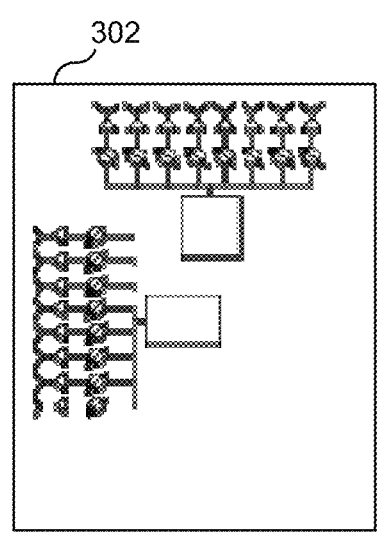
FIG. 3 illustrates a WD being equipped with at least two antenna panels.
Figure 4:
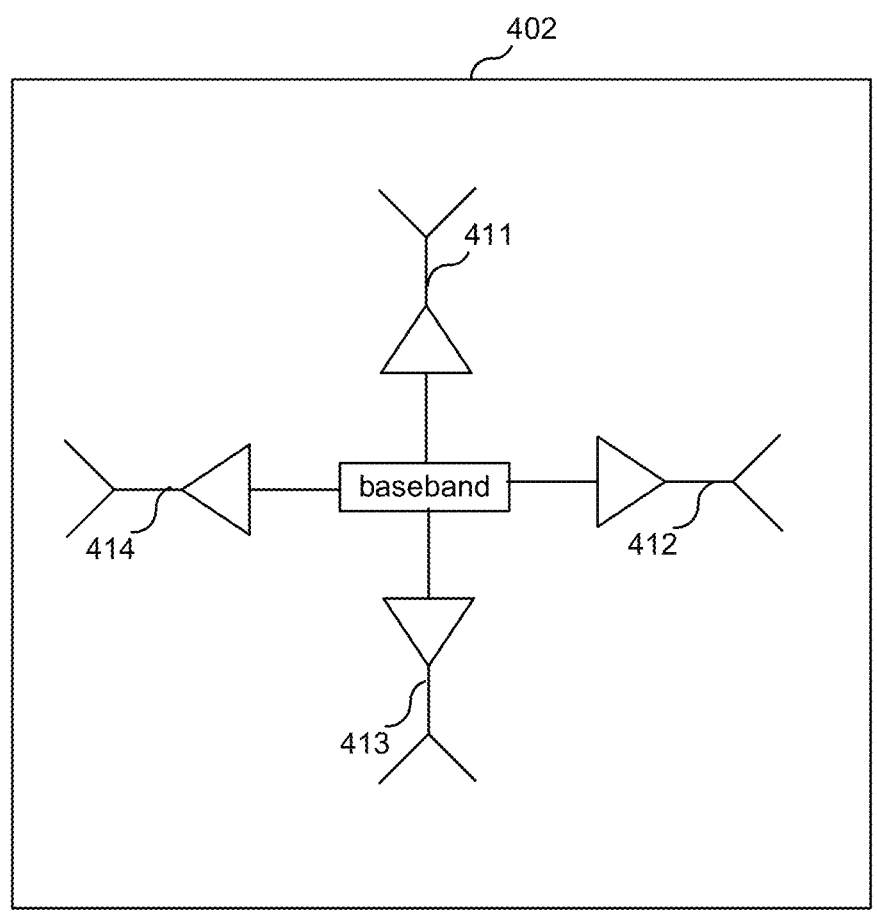
FIG. 4 illustrates a WD being equipped with directional antennas pointing in different directions.
Figure 5:
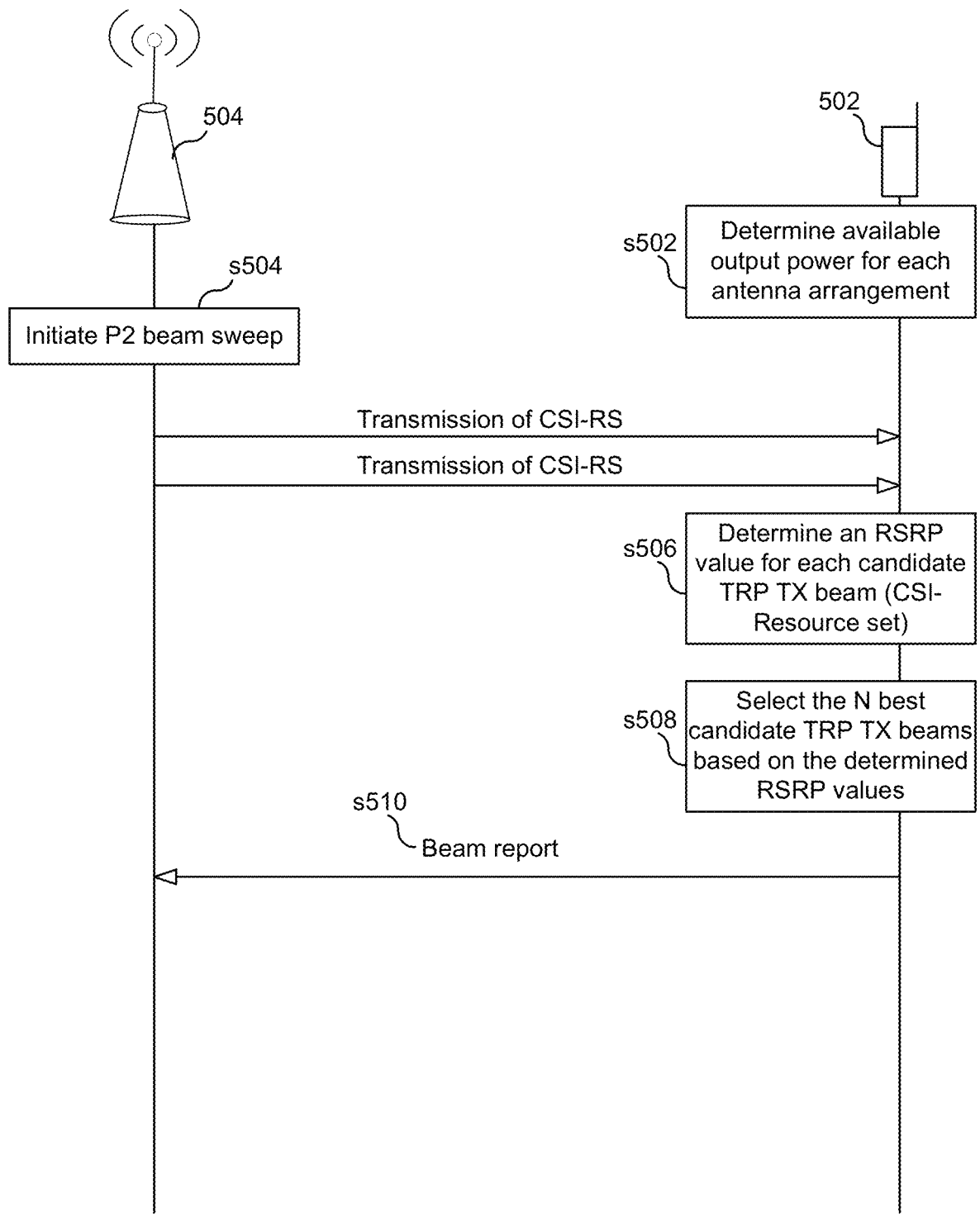
FIG. 5 is an example message flow diagram illustrating a process according to an embodiment.
Figure 6:
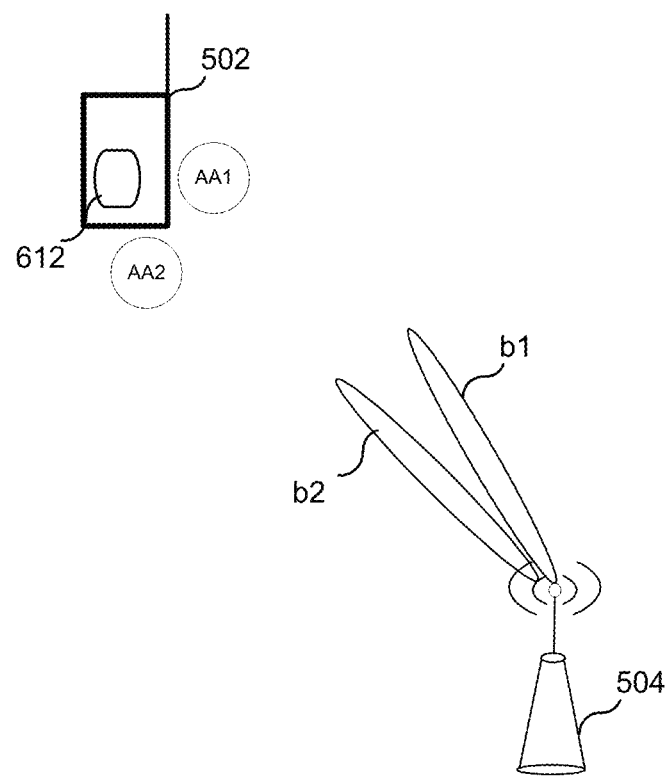
FIG. 6 illustrates a TRP communicating with a WD.

FIG. 5 is a message flow diagram illustrating a process according to an embodiment. In step s502, WD 502 determines the available output power for each of its antenna arrangements. For this example, we will assume that WD 502 has two antenna arrangements: a first antenna arrangement AA1 and a second antenna arrangement AA2 (see FIG. 6). Accordingly, in this example WD 502 determines TP1 (the available output power for the first antenna arrangement—a.k.a., first UL transmit power) and determines TP2 (the available output power for the second antenna arrangement—a.k.a., second UL transmit power).

In some embodiments, the WD determines the available UL transmit power for each antenna arrangement based solely on the power amplifier (PA) implementation at the WD, which is known to the WD. In another embodiment, the WD determines if any candidate uplink (UL) TX beam from the different WD antenna arrangements hits a human body (which may for example be detected by using proximity censors, accelerometers, cameras etc), and based on that information determines the available output power of the different antenna arrangements. In yet another embodiment, for each antenna arrangement at the WD, the WD determines if the TX chain is turned off for the antenna arrangement, and in this way determines that the available output power for that antenna arrangement would be zero. If panel, antenna, and or beam-specific power control is used, each antenna arrangements may be associated with a different open loop and/or closed loop power control mechanism. In that case, such information may also be utilized to determine the available output power for the different WD antenna arrangements.

In step s504, the serving TRP 504 initiates a P2 beam sweep and then performs the sweep by transmitting CSI-RS using the different candidate TRP TX beams (in this example we will assume that the set of candidate TRP TX beams consists of two different TRP TX beams: beam b1 and beam b2 (see FIG. 6)). In the example illustrated in FIG. 5, there are at least two different CSI-RS transmission, one for each of the two candidate TRP TX beams. In some embodiments, initiating the P2 beam sweep includes the TRP 504 sending to WD 502 a unique CSI-RS resource indicator (CRI) for each of the candidate TRP TX beams. Each CRI identifies to WD 502 the resources (e.g., time-frequency resources) that TRP 504 will use when the TRP 504 uses the TX beam corresponding to the CRI to transmit the CSI-RS. In this way, WD 504 can map the reception of a CSI-RS to a specific candidate TRP TX beam as the CRI functions as a beam indicator.

In step s506, WD 502 determines an RSRP value for each of the two candidate TRP TX beams based on the CSI-RS transmissions. As described above, a straightforward solution would be to just calculate, for each CSI-RS resource (i.e., each TRP TX beam), two RSRP values (one for each antenna arrangement) and then take the linear average of the two RSRP values to get a final RSRP value for the candidate TRP TX beam. However, this might lead to sub-optimal recommendations of TRP TX beams w.r.t. UL performance since the selected BPL for downlink might depend on a WD antenna arrangement that as limited output power in UL (or even zero output power, in case the panel WD TX chain is turned off). This can cause the WD to lose UL coverage (UL coverage is expected to be very challenging for higher frequencies) that might lead to a radio link failure.

Accordingly, instead of calculating the final RSRP in the straightforward fashion, the WD may take the information about available output power for the different antenna arrangement attained in step s502 into account when calculating the final RSRP value. This could be done by weighting the individual RSRP values for the two WD antenna arrangements unequally when calculating the final RSRP value.

For example, in one scenario, the lower the available output power is for a certain WD antenna arrangement, the RSRP value for that antenna is weighted lower when calculating the final RSRP. For instance, assume that for a given TRP TX beam candidate the WD: 1) determines a first RSRP value (RSRP-1) based on the CSI-RS that was transmitted using the given TRP TX beam candidate and received using the first antenna arrangement and 2) determines a second RSRP value (RSRP-2) based on the CSI-RS that was transmitted using the given TRP TX beam candidate and received using the second antenna arrangement. In this scenario, the final RSRP (RSRP-Final) value for the given candidate TRP TX beam may be calculated as follows: RSRP–Final=W1*RSRP–1+W2*RSRP–2, where W1+W2=1 and W1 and W2 are a function of TP1 and TP2. For instance, W1=(TP1/TP2)×W2 for TP2>0.

In an extreme case where the available output power of an antenna arrangement is zero (e.g., TP2=0), the corresponding weight for calculating the resulting RSRP is also set to zero (e.g., if TP2=0, then W2 is set to 0), such that the resulting RSRP will only be calculated based on RSRP from the other antenna arrangement at the WD. This implies that the WD selects the preferred DL beam taking into account both expected UL and expected DL performance. In some embodiments, such a weighting scheme is only applied when the WD knows that the UL beam selection will be implicitly determined by the DL beam selection, which the WD may know from a Radio Resource Control (RRC) configuration transmitted to the WD.

In yet another embodiment the WD 502 takes an estimate UL link budget into account when determining the RSRP weights (e.g., W1 and W2) for the different antenna arrangements during a P2 beam sweep. The UL link budget could for example be estimated based on DL RS signals used for UL power control. In case the estimated link budget is very poor such that the WD is far from being able to apply the desired output power needed for reaching the open loop power control goal of x dB SINR, the WD should put larger weight on the RSRP calculated on antenna arrangements with higher available WD output power, since otherwise there is a risk that the WD will lose the UL coverage which might lead to radio link failure.

In yet another embodiment the WD 502 takes its UL buffer status (or some other way to estimate the needed capacity in UL vs DL) in to account when determining the RSRP calculation weights. For example, if the WD has a lot of data to transmit in UL, the WD should use RSRP weights that mainly facilitate the UL link, while if the WD has a lot of data to receive in DL, the WD should not be so aggressive with changing the weights for the RSRP in order to improve the UL.

In step s508, after determining the final RSRP value for each candidate TRP TX beam, WD 502 uses the final RSRP values to select the N best candidate TRP TX beams (N>0).

In step s510, the WD reports back the CSI-RS resource indicator(s) (CRI(s)) corresponding to the selected N best TRP TX beam(s). The TRP may then utilize the beam report for both UL and DL beam selection.

Figure 7:
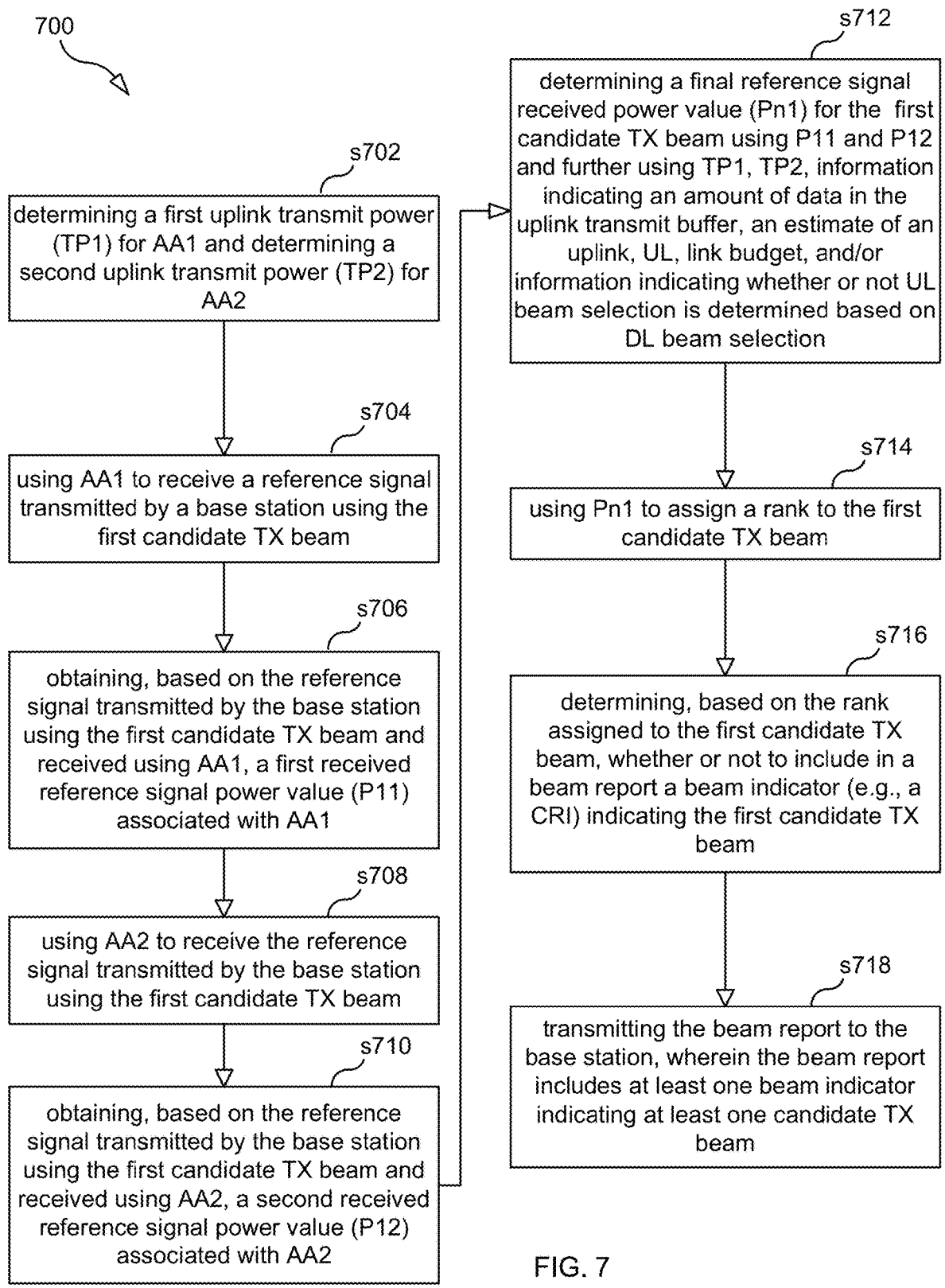
FIG. 7 is a flow chart illustrating a process according to an embodiment.

FIG. 7 is a flow chart illustrating a process 700, according to one embodiment, for selecting candidate TX beams included in a set of candidate TX beams including at least a first candidate TX beam b1. Process 700 is performed by WD 502 and may begin in step s702.

Step s702 comprises determining a first uplink transmit power (TP1) for the first antenna arrangement AA1 and determining a second uplink transmit power (TP2) for the second antenna arrangement AA2.

Step s704 comprises using the first antenna arrangement to receive a reference signal transmitted by a base station (e.g., TRP 504) using the first candidate TX beam.

Step s706 comprises obtaining, based on the reference signal transmitted by the base station using the first candidate TX beam and received using the first antenna arrangement, a first received reference signal power value (P11) associated with the first antenna arrangement.

Step s708 comprises using the second antenna arrangement to receive the reference signal transmitted by the base station using the first candidate TX beam.

Step s710 comprises obtaining, based on the reference signal transmitted by the base station using the first candidate TX beam and received using the second antenna arrangement, a second received reference signal power value (P12) associated with the second antenna arrangement.

Step s712 comprise determining a final reference signal received power value (Pn1) for the first candidate TX beam using P11 and P12 and further using TP1, TP2, information indicating an amount of data in the uplink transmit buffer, an estimate of an uplink, UL, link budget, and/or information indicating whether or not UL beam selection is determined based on DL beam selection.

Step s714 comprises using Pn1 to assign a rank to the first candidate TX beam.

Step s716 comprises determining, based on the rank assigned to the first candidate TX beam, whether or not to include in a beam report a beam indicator (e.g., a CRI) indicating the first candidate TX beam.

Step s718 comprises transmitting the beam report to the base station, wherein the beam report includes at least one beam indicator indicating at least one candidate TX beam.

In some embodiments, determining Pn1 comprises calculating (W1×P11)+(W2×P12), wherein the values of W1 and W2 are dependent on TP1 and TP2, the amount of data in the uplink transmit buffer, the estimate of the UL link budget, and/or information indicating whether or not UL beam selection is determined based on DL beam selection.

In some embodiments, process 700 may further include: determining whether the transmit buffer contains more than a threshold amount of data; and setting each of W1 and W2 to a value that is dependent on TP2 and TP1 if and only if it is determined that: i) the transmit buffer contains more than a threshold amount of data and ii) the information indicates that UL beam selection is determined based on DL beam selection, otherwise setting W1 and W2 to default values (e.g. W1 and W2 are both set to a default value of 0.5).

In some embodiments, process 700 may also include determining that the transmit buffer contains less than a threshold amount of data; and setting W1 and W2 equal to 0.5 as a result of determining that the transmit buffer contain less than the threshold amount of data.

In some embodiments, W1+W2=1, W2=((TP2/TP1)+A+B)×W1, A is a value that is dependent on the amount of data in the uplink buffer, and B is a value that is dependent on the estimate of the UL link budget. In some embodiments, A=B=0.

In some embodiments, process 700 may also include receiving a message comprising the information indicating whether or not UL beam selection is determined based DL beam selection; determining that the information indicates that UL beam selection is not determined based DL beam selection; and as a result of determining that the information indicates that UL beam selection is not determined based DL beam selection, setting W1 to a default value and setting W2 to a default value.

In some embodiments, process 700 may also include using the first antenna arrangement to receive a reference signal transmitted by the base station using a second candidate TX beam; obtaining, based on the reference signal transmitted by the base station using the second candidate TX beam and received using the first antenna arrangement, a third received reference signal power value, P21, associated with the first antenna arrangement; using the second antenna arrangement to receive the reference signal transmitted by the base station using the second candidate TX beam; obtaining, based on the reference signal transmitted by the base station using the second candidate TX beam and received using the second antenna arrangement, a fourth received reference signal power value, P22, associated with the second antenna arrangement; determining a final reference signal received power value, Pn2, for the second candidate TX beam using P21 and P22 and further using TP1, TP2, information indicating the amount of data in the uplink transmit buffer, and/or the estimate of the UL link budget; using Pn2 to assign a rank to the second candidate TX beam; and determining, based on the rank assigned to the second candidate TX beam, whether or not to include in the beam report a beam indicator indicating the second candidate TX beam. In some embodiments, determining, based on the rank assigned to the second candidate TX beam, whether or not to include in the beam report a beam indicator indicating the second candidate TX beam comprises determining whether Pn2 is larger than Pn1. In some embodiments, process 700 may also include including in the beam report a reference signal resource index (e.g., a CRI) corresponding to the second candidate TX beam as a result of determining that Pn2 is larger than Pn1.

Figure 8:
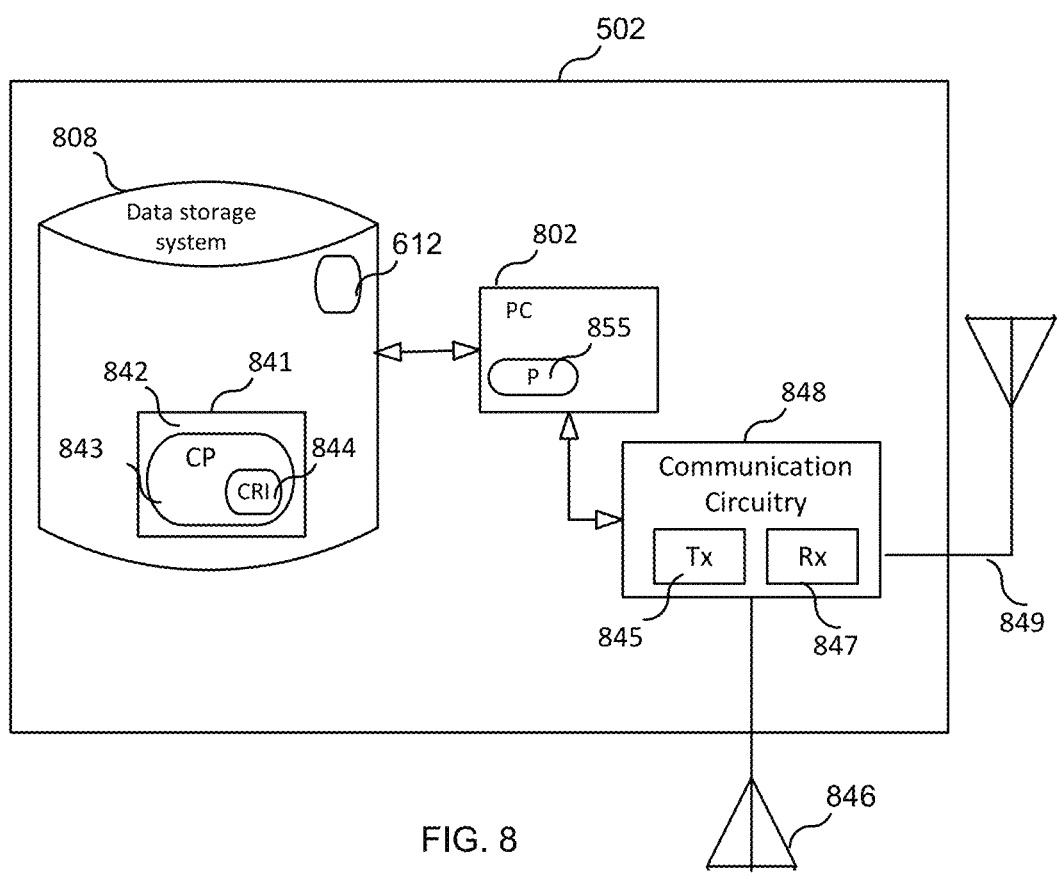
FIG. 8 is a block diagram of an apparatus according to one embodiment.

FIG. 8 is a block diagram of WD 502, according to some embodiments. As shown in FIG. 8, WD 502 may comprise: processing circuitry (PC) 802, which may include one or more processors (P) 855 (e.g., one or more general purpose microprocessors and/or one or more other processors, such as an application specific integrated circuit (ASIC), field-programmable gate arrays (FPGAs), and the like); communication circuitry 848 coupled to a first antenna arrangement 849 and a second antenna arrangement 846 and comprising a transmitter (Tx) 845 and a receiver (Rx) 847 for enabling WD 502 to transmit data and receive data (e.g., wirelessly transmit/receive data); and a local storage unit (a.k.a., "data storage system") 808 which may include one or more non-volatile storage devices and/or one or more volatile storage devices. As shown in FIG. 8, buffer 612 may be a component of the local storage unit 808. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes WD 502 to perform steps described herein (e.g., steps described herein with reference to the flow charts). In other embodiments, WD 502 may be configured to perform steps described herein without the need for code. That is, for example, PC 802 may consist merely of one or more ASICs. Hence, the features of the embodiments described herein may be implemented in hardware and/or software.

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for selecting candidate transmit (TX) beams included in a set of candidate TX beams including at least a first candidate TX beam, wherein the method is performed by a wireless device, and wherein the wireless device comprises an uplink transmit buffer for storing data for transmission and a plurality of antenna arrangements, including a first antenna arrangement and a second antenna arrangement, the method comprising:
determining a first uplink transmit power, TP1, for the first antenna arrangement;
determining a second uplink transmit power, TP2, for the second antenna arrangement;
using the first antenna arrangement to receive a reference signal transmitted using the first candidate TX beam;
obtaining, based on the reference signal transmitted using the first candidate TX beam and received using the first antenna arrangement, a first received reference signal power value, P11, associated with the first antenna arrangement;

using the second antenna arrangement to receive the reference signal transmitted using the first candidate TX beam;

obtaining, based on the reference signal transmitted using the first candidate TX beam and received using the second antenna arrangement, a second received reference signal power value, P12, associated with the second antenna arrangement;

determining a first final reference signal received power value, Pn1, for the first candidate TX beam using P11 and P12 and further using one or any combination of: TP1, TP2, information indicating an amount of data in the uplink transmit buffer, an estimate of an uplink (UL) link budget, or information indicating whether or not UL beam selection is determined based on DL beam selection;

determining, based on Pn1, whether or not to include in a beam report a beam indicator indicating the first candidate TX beam; and transmitting the beam report to the base station, wherein the beam report includes at least one beam indicator indicating at least one candidate TX beam.

2. The method of claim 1, wherein determining Pn1 comprises calculating Pn1=(W1×P11)+(W2×P12), wherein the values of W1 and W2 are dependent on TP1 and TP2, the amount of data in the uplink transmit buffer, the estimate of the UL link budget, and/or information indicating whether or not UL beam selection is determined based on DL beam selection.

3. The method of claim 2, further comprising:
determining whether the transmit buffer contains more than a threshold amount of data; and
setting each of W1 and W2 to a value that is dependent on TP2 and TP1 if and only if it is determined that: i) the transmit buffer contains more than a threshold amount of data and ii) the information indicates that UL beam selection is determined based on DL beam selection, otherwise setting W1 and W2 to default values.

4. The method of claim 2, further comprising:
determining that the transmit buffer contains less than a threshold amount of data; and
setting W1 and W2 equal to 0.5 as a result of determining that the transmit buffer contain less than the threshold amount of data.

5. The method of claim 2, wherein:

$$W1 + W2 = 1,$$
$$W2 = ((TP2/TP1) + A + B) \times W1,$$

A is a value that is dependent on the amount of data in the uplink buffer, and
B is a value that is dependent on the estimate of the UL link budget.

6. The method of claim 5, wherein A=B=0.

7. The method of claim 1, further comprising
receiving a message comprising the information indicating whether or not UL beam selection is determined based on DL beam selection;
determining that the information indicates that UL beam selection is not determined based on DL beam selection; and
as a result of determining that the information indicates that UL beam selection is not determined based on DL beam selection, setting W1 to a default value and setting W2 to the default value or another default value.

8. The method of claim 1, further comprising:
using the first antenna arrangement to receive a reference signal transmitted by the base station using a second candidate TX beam;
obtaining, based on the reference signal transmitted by the base station using the second candidate TX beam and received using the first antenna arrangement, a third received reference signal power value, P21, associated with the first antenna arrangement;
using the second antenna arrangement to receive the reference signal transmitted by the base station using the second candidate TX beam;
obtaining, based on the reference signal transmitted by the base station using the second candidate TX beam and received using the second antenna arrangement, a fourth received reference signal power value, P22, associated with the second antenna arrangement;
determining a final reference signal received power value, Pn2, for the second candidate TX beam using P21 and P22 and further using TP1, TP2, information indicating the amount of data in the uplink transmit buffer, and/or the estimate of the UL link budget; and
determining, based on Pn2, whether or not to include in the beam report a beam indicator indicating the second candidate TX beam.

9. The method of claim 8, wherein determining, based on Pn2, whether or not to include in the beam report a beam indicator indicating the second candidate TX beam comprises determining whether Pn2 is larger than Pn1.

10. The method of claim 9, further comprising including in the beam report a reference signal resource index corresponding to the second candidate TX beam as a result of determining that Pn2 is larger than Pn1.

11. A wireless device (WD), the WD comprising:
an uplink transmit buffer;
a first antenna arrangement; and
a second antenna arrangement, wherein the wireless device is configured to perform a process that comprises:
determining a first uplink transmit power, TP1, for the first antenna arrangement;
determining a second uplink transmit power, TP2, for the second antenna arrangement;
using the first antenna arrangement to receive a reference signal transmitted by a base station using the first candidate TX beam;
obtaining, based on the reference signal transmitted by the base station using the first candidate TX beam and received using the first antenna arrangement, a first received reference signal power value, P11, associated with the first antenna arrangement;
using the second antenna arrangement to receive the reference signal transmitted by the base station using the first candidate TX beam;
obtaining, based on the reference signal transmitted by the base station using the first candidate TX beam and received using the second antenna arrangement, a second received reference signal power value, P12, associated with the second antenna arrangement;
determining a final reference signal received power value, Pn1, for the first candidate TX beam using P11 and P12 and further using TP1, TP2, information indicating an amount of data in the uplink transmit buffer, an estimate of an uplink, UL, link budget, and/or information indicating whether or not UL beam selection is determined based on DL beam selection;

determining, based on Pn1, whether or not to include in a beam report a beam indicator indicating the first candidate TX beam; and transmitting the beam report to the base station, wherein the beam report includes at least one beam indicator indicating at least one candidate TX beam.

12. The WD of claim 11, wherein the UE is configured to determine Pn1 by calculating Pn1=(W1×P11)+(W2×P12), wherein the values of W1 and W2 are dependent on TP1 and TP2, the amount of data in the uplink transmit buffer, the estimate of the UL link budget, and/or information indicating whether or not UL beam selection is determined based on DL beam selection.

13. The WD of claim 12, wherein the WD is further adapted to:

determine whether the transmit buffer contains more than a threshold amount of data; and set each of W1 and W2 to a value that is dependent on TP2 and TP1 if and only if it is determined that: i) the transmit buffer contains more than a threshold amount of data and ii) the information indicates that UL beam selection is determined based on DL beam selection, otherwise setting W1 and W2 to default values.

14. The WD of claim 12, wherein the WD is further configured to:

determine whether the transmit buffer contains less than a threshold amount of data; and set W1 and W2 equal to a predetermined value as a result of determining that the transmit buffer contains less than the threshold amount of data.

15. The WD of claim 12, wherein $$W1 + W2 = 1,$$
$$W2 = ((TP2/TP1) + A + B) \times W1,$$

A is a value that is dependent on the amount of data in the uplink buffer, and

B is a value that is dependent on the estimate of the UL link budget.

16. The WD of claim 15, wherein A=B=0.

17. The WD of claim 11, wherein the WD is further configured to:

determine, based on information included in a received message, whether UL beam selection is not determined based on DL beam selection; and as a result of determining that UL beam selection is not determined based on DL beam selection, set W1 to a default value and set W2 to the default value or another default value.

18. The WD of claim 11, wherein the WD is further configured to:

use the first antenna arrangement to receive a reference signal transmitted by the base station using a second candidate TX beam;

obtain, based on the reference signal transmitted by the base station using the second candidate TX beam and received using the first antenna arrangement, a third received reference signal power value, P21, associated with the first antenna arrangement;

use the second antenna arrangement to receive the reference signal transmitted by the base station using the second candidate TX beam;

obtain, based on the reference signal transmitted by the base station using the second candidate TX beam and received using the second antenna arrangement, a fourth received reference signal power value, P22, associated with the second antenna arrangement;

determine a final reference signal received power value, Pn2, for the second candidate TX beam using P21 and P22 and further using TP1, TP2, information indicating the amount of data in the uplink transmit buffer, and/or the estimate of the UL link budget; and determine, based on Pn2, whether or not to include in the beam report a beam indicator indicating the second candidate TX beam.

19. The WD of claim 18, wherein the WD is configured to determine whether or not to include in the beam report the beam indicator indicating the second candidate TX beam by performing a process that includes comparing Pn2 with Pn1.

20. A computer program product comprising a non-transitory computer readable medium storing a computer program comprising instructions for adapting an apparatus to perform the method of claim 1.

* * * * *